Feb. 17, 1959    W. L. PERRINE    2,873,911
MECHANICAL INTEGRATING APPARATUS
Filed May 26, 1955    4 Sheets-Sheet 1

INVENTOR.
WARREN L. PERRINE
BY
Theodore H. Lassagne
ATTORNEY

Feb. 17, 1959 W. L. PERRINE 2,873,911
MECHANICAL INTEGRATING APPARATUS
Filed May 26, 1955 4 Sheets-Sheet 3

INVENTOR.
WARREN L. PERRINE
BY
ATTORNEY

Feb. 17, 1959 W. L. PERRINE 2,873,911
MECHANICAL INTEGRATING APPARATUS
Filed May 26, 1955 4 Sheets-Sheet 4

INVENTOR.
WARREN L. PERRINE
BY
ATTORNEY

United States Patent Office 2,873,911
Patented Feb. 17, 1959

2,873,911

MECHANICAL INTEGRATING APPARATUS

Warren L. Perrine, Pasadena, Calif., assignor to Librascope, Incorporated, Glendale, Calif., a corporation of California Application May 26, 1955, Serial No. 511,328

26 Claims. (Cl. 235—61)

The present invention relates to metering apparatus of the pressure-differential integrating type for measuring the volume or rate of flow of fluids through conduits, and more particularly to an integrating mechanism especially adapted for use in such metering apparatus.

In certain types of metering apparatus designed to measure the amount of fluid flowing through a pipe or other conduit known as the pressure-differential type, it is necessary to measure the pressure of the fluid in the pipe at opposite sides of an orifice, and to then convert the pressure drop into a square root value. The square root value and the fluid pressure are then integrated with respect to successive increments of time to obtain the amount of fluid flow.

A number of attempts have been made to measure the flow of fluid in the manner described above. The apparatus resulting from these attempts has been disadvantageous for several reasons. One reason is that they have required amplifiers to build up the drop in pressure across the orifice in order to obtain indications of any accuracy from the integrator. Another reason is that they have made intermittent measurements of the fluid pressure and the drop in fluid pressure. Since the measurements have been intermittent, average values of the pressure and drop in pressure have had to be approximated between successive measurements. These average values have led to substantial inaccuracies, especially when the parameters such as the pressure and drop in pressure have fluctuated considerably.

This invention provides apparatus which overcomes the above disadvantages. It receives instantaneous indications representing a parameter such as the drop in pressure across an orifice. It then converts these indications into instantaneous movements representing a particular function such as the square root of the parameter. The apparatus obtains this conversion without having to amplify the instantaneous indications representing the parameter. The apparatus then integrates the particular function with respect to variations in an independent quantity, such as time.

The apparatus herein illustrated and described as embodying this invention includes an integrator and adjusting means operable in conjunction with the integrator to vary the response of the integrator. The integrator includes a first disc adapted to be driven by a motor at a substantially constant speed to represent time. A second disc is adapted to be driven by the first disc through transmitting means such as a pair of balls. The transmitting means can be varied by the adjusting means radially in position relative to the second disc so as to vary the speed at which the second disc is rotated by the first disc.

The adjusting means include an input member such as a plate linearly displaceable in accordance with variations in an input value so as to produce corresponding displacements of the transmitting means such as the balls. The movements of the input member are in turn controlled by linkages pivotable in accordance with variations in the input value. By providing a particular relationship between the linkages and the input member, the movements of the linkage member are converted into linear movements by the input member representing a particular function of the input values. For example, the linkages and the input member may operate to provide the input member with a linear displacement closely approximating a value such as the drop in pressure across an orifice. This linear displacement by the input member is then used to obtain a movement by the second disc representing the integral of the square root of the drop in pressure with respect to the independent variable such as time.

In the embodiment of the invention shown in Figures 1 to 7, inclusive, a casing 10 is adapted to be secured to a bottom cover 12 to form an enclosure. The top surface of the cover is flat and smooth for reasons which will be disclosed in detail hereinafter. A shaft 14 (Figures 4 and 5) extends through the bottom cover 12 and through bearings 16 for rotation relative to the cover and the bearings. The shaft is adapted to drive a gear 18 (Figure 4) mounted on the shaft, gear 18 in turn being in mesh with a toothed disc 20 (Figures 3 and 4) having top and bottom faces which are flat and smooth.

The disc 20 is mounted on one end of a pin 22 (Figure 4) having its top surface ground even with the top face of the disc. The pin 22 extends into the cover 12 at the other end so as to remain stationary while the disc rotates. The pin 22 has a particular radius such as approximately 0.025 inch for reasons which will be disclosed in detail hereinafter. A cage 24 (Figures 4 and 5) is mounted on the pin 22 between the disc 20 and the cover 12. The cage 24 has a plurality of sockets at spaced intervals along its periphery to hold a plurality of balls 26. The balls 26 contact the disc 20 and the cover 12 to provide a kinematical design for insuring that the disc remains parallel to the cover 12 under varying amounts of load on the disc.

A plate 30 (Figures 3, 4 and 5) is disposed above the disc 20. The plate 30 is provided with a somewhat triangular configuration and is movable by a roller 32 (Figure 3) disposed at the apex of the triangle and by a pair of rollers 34 (Figures 3 and 5) disposed at the corners of the triangular legs. The rollers 32 and 34 are pressed into sockets in the plate 30. The roller 32 is positioned on a block 36 (Figure 3) for movement along the block and the rollers 34 are similarly positioned on a block 38. The blocks 36 and 38 are respectively fastened to the cover 12 as by screws 40 and 42. By disposing the rollers 32 and 34 at spaced positions on the blocks 36 and 38 and by supporting the plate 30 on the rollers, the plate 30 is able to be moved with a minimum amount of friction. Since only three rollers are provided, the plate 30 is maintained in a fixed plane and at the same time friction against movement of the plate is minimized.

The plate 30 is provided with a bossed portion 44 (Figure 4) having a vertical hole for supporting a sleeve 46. The sleeve 46 may be made from a suitable material such as Teflon, which is polymerized tetrafluoroethylene or nylon having soft and resilient properties. A pair of balls 48 and 50 or other suitable free rolling members are disposed within the sleeve 46 and are provided with a suitable diameter to lightly contact the walls of the sleeve. The ball 48 rests on the disc 20 and the ball 50 rests on the ball 48. The balls 48 and 50 are disposed directly to the left of the center of the disc 20.

The movement of the plate 30 is controlled by a plurality of linkages. One of these linkages is indicated at 54 in Figures 3 and 7 and is provided with an effective pivotal length such as approximately 0.73 inch. The linkage 54 is provided with a socket at one end for seating a ball 56. The ball 56 extends into a hole 58 (Figure 7) in the plate 30 and contacts at its upper end a leaf spring 60 attached as by a rivet to the plate 30. The leaf spring 60 presses the ball 56 into the hole 58 so that the plate 30 will follow the pivotal movements of the linkage 54. The linkage 54 is pivotable on a fulcrum at its other end. This fulcrum is provided by a ball 61 extending through a socket in the linkage 54 and pressed against the block 36 by a leaf spring 62. The leaf spring 62 is attached as by a screw to the block 36.

In like manner, a linkage 64 controls the movement of the plate 30. The linkage 64 has an effective pivotal length equal to that of the linkage 54. The linkage 64 is separated laterally by a suitable distance such as approximately 0.73 inch from the linkage 54 and by approximately 0.38 inch from the centers of the balls 48 and 50. The linkage 64 is disposed in an opposite direction to the linkage 54 for reasons which will be disclosed in detail hereinafter.

Figure 2:
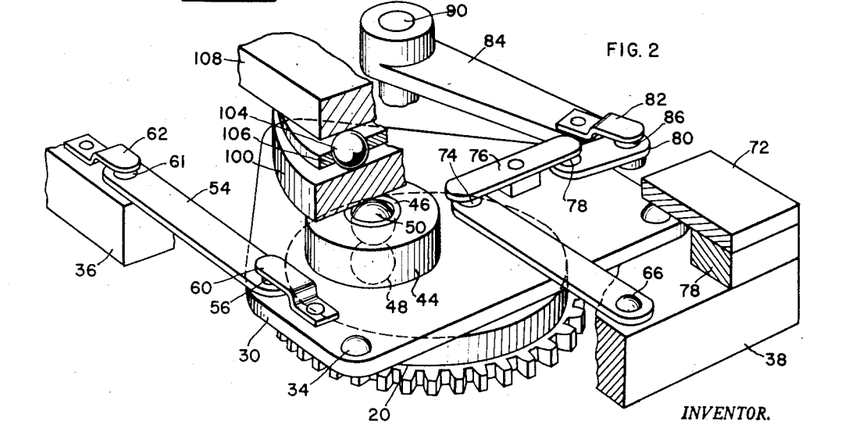
Figure 2 is an enlarged fragmentary perspective view somewhat schematically illustrating the interrelationship between important components in the integrating apparatus shown in Figure 1, as seen from a position above and in front of the components.
Figure 3:
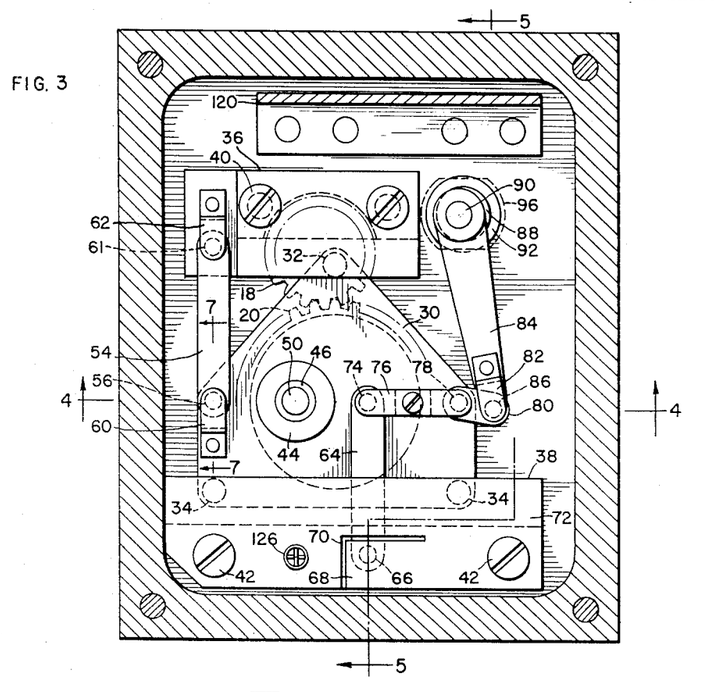
Figure 3 is an enlarged plan view in section of the integrating apparatus shown in Figures 1 and 2 and is taken substantially on the line 3—3 of Figure 4.
Figure 4:
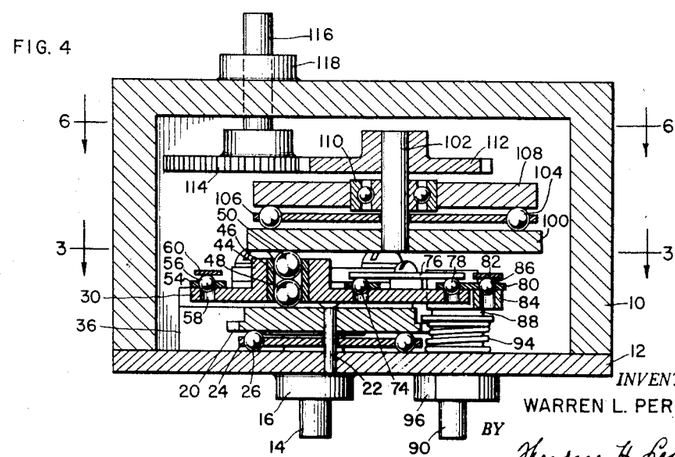
Figure 4 is an enlarged front elevational view in section of the integrating apparatus and is taken substantially on the line 4—4 of Figure 3.
Figure 5:
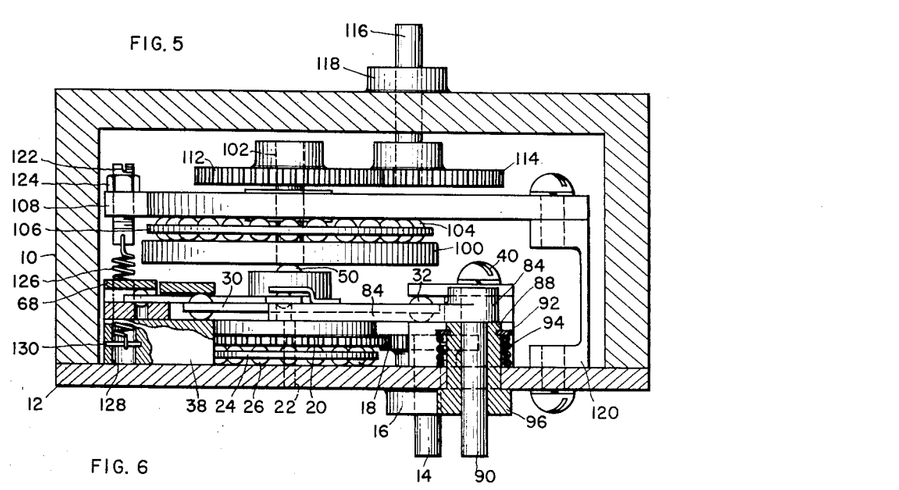
Figure 5 is an enlarged side elevational view in section of the integrating apparatus and is taken substantially on the line 5—5 of Figure 3, certain components being partially broken away to show other components more clearly.
Figure 6:
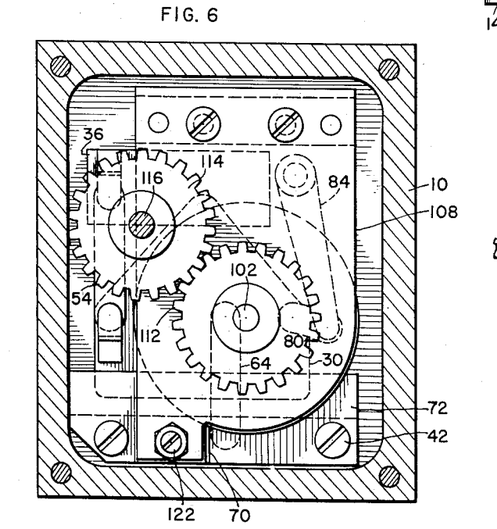
Figure 6 is an enlarged plan view in section of the integrating apparatus and is taken substantially on the line 6—6 of Figure 4.
Figure 7:
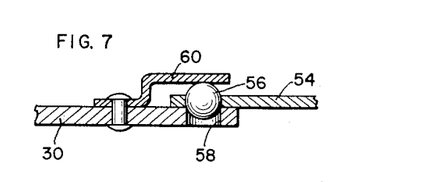
Figure 7 is an enlarged sectional view substantially on the line 7—7 of Figure 3 and illustrates in further detail the operation of certain components shown in the previous figures.

The linkage 64 is supported at one end on the block 38 as by a ball 66 (Figure 3) and a spring portion 68 (Figures 3 and 5) is pressed downwardly against the ball to fixedly position the linkage. The spring 68 is formed by providing an L-shaped groove 70 in a plate 72 (Figures 2 and 5). The plate 72 is adapted to ride on the rollers 34 and is fixedly positioned above the block 38 by disposing spacers 78 (Figure 2) between it and the block.

At its opposite end, the linkage 64 is pressed against the plate 30 by a ball 74 (Figures 3 and 4) extending through a socket in the linkage and by a leaf spring 76. The leaf spring 76 is pressed against the ball 74 at one end and at an intermediate position is attached as by a screw to the plate. At its opposite end, the leaf spring 76 pressed against a ball 78 disposed in a socket in a linkage 80 and resting against the plate 30. The linkage 80 has a relatively short pivotal length such as approximately 0.19 inch.

A leaf spring 82 suitably attached as by a rivet to an arm 84 presses a ball 86 into a hole in the arm. The ball 86 extends through a socket in the linkage 80 at the opposite end of the linkage from the ball 78. The arm 84 is provided with an effective pivotal length such as approximately 0.95 inch. The arm 84 is mounted on a shaft 90 for pivotal movement, and a bushing 88 is also mounted on the shaft. The bushing 88 and the shaft extend through a socket in the bottom cover 12 so that the shaft can be adjustably positioned in the socket by turning the bushing.

After adjustment, the bushing 88 is maintained in fixed positioning by a lock washer 92, a flange helical spring 94 and a flange portion 96 on the bushing. The lock washer 92 is fixedly positioned in a neck portion of the bushing 88 and the helical spring 94 is held in constrained relationship between the washer and the cover 12. The flange portion 96 on the bushing 88 is pressed against the bottom surface of the cover 12 by the action of the spring 94. Since the flange portion 96 is pressed against the cover 12, the friction between the flange portion and the cover prevents the bushing 88 from being turned after it has once been adjusted in position.

As previously disclosed, the balls 48 and 50 are carried within the sleeve 46. The ball 48 contacts the disc 20, and the ball 50 contacts a disc 100 (Figures 4 and 5) mounted on a shaft 102 for rotation with the shaft. A plurality of balls 104 ride on the top face of the disc 100. The balls 104 are disposed in spaced relationship in sockets at the periphery of a cage 106 and are adapted to contact a support plate 108 disposed above the balls. The cage 106 is rotatable with the shaft 102 but bearings 110 are disposed between the support plate and the shaft to maintain the support plate stationary while the shaft rotates. A gear 112 is mounted on the shaft 102 and is in mesh with a gear 114 carried by on output shaft 116. The shaft 116 extends through the top of the casing 10 and is rotatable in bearings 118.

The support plate 108 is attached at one end to the cover 12 as by a bracket 120 (Figure 5). At the other end of the support plate 108, a screw 122 is adjustably positioned in a tapped hole in the plate. The screw 122 is maintained in fixed positioning after adjustment by a nut 124 which can be locked against the plate. At its bottom end, the screw 122 supports a helical spring 126 which extends through a hole 128 in the block 38. The spring 126 is attached at its bottom end to a pin 130 which extends longitudinally across the hole. The spring is disposed in constrained relationship to press the support plate 108 downwardly on the balls 104 with a proper amount of force. This pressure from spring 126 is transmitted through ball race 104 into disc 100. Thus, proper compression is maintained between disc 100, balls 50 and 48, and disc 20, to prevent slipping.

The enclosure formed by the casing 10 and the cover 12 is preferably filled with lubricating oil. The oil serves several important functions. It minimizes friction and it prevents ice from forming on the different components when the apparatus is being used in cold regions such as the Arctic. It also prevents dust from collecting on various components such as the balls 32 and 34 and the balls 48 and 50 to produce a deterioration in the operation of the components.

Figure 1:
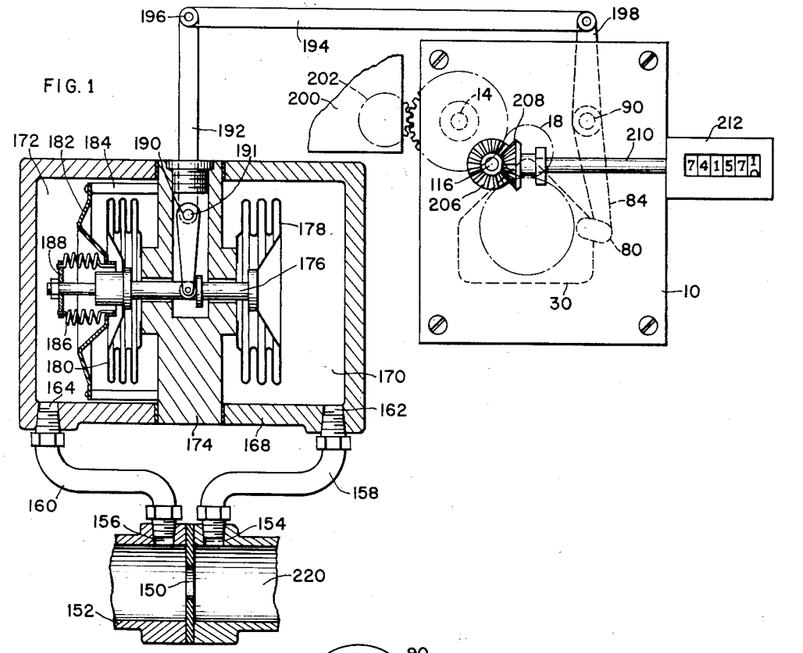
Figure 1 is a somewhat schematic view illustrating in section apparatus for measuring the drop in fluid pressure across an orifice and integrating apparatus for converting the measurements into a particular function such as a square root and for integrating the function with respect to variations in time.

The apparatus shown in Figures 2 to 7, inclusive, and described above is adapted to be used with different types of auxiliary equipment to obtain desirable results. One type of equipment which may be used is shown in Figure 1. This equipment is adapted to measure the drop in fluid pressure across an orifice 150 disposed in a pipe 152 through which the fluid flows. Nozzles 154 and 156 respectively communicate with the pipe on the upstream and downstream side to receive some of the fluid flowing through the pipe. The nozzles 154 and 156 are respectively attached to conduits 158 and 160 having nozzles 162 and 164 at their other end.

The nozzle 162 is attached to one end of a housing 168 and the nozzle 164 is attached to the other end of the housing 168. The housing 168 is separated into two compartments 170 and 172 by a wall 174. A rod 176 extends through the wall 174 into the compartments 170 and 172. A bellows 178 is supported on the rod 176 in the compartment 170 and is disposed at one end against the wall 174. Similarly, a bellows 180 is supported on the rod 176 in the compartment 172 and is disposed at one end against the wall 174.

A hub 182 made from suitably resilient material is also disposed in the compartment 172 and is attached at its inner periphery to the rod 176, and at its outer periphery to studs 184 extending from the wall 174. Helical springs 186 are supported on the rod 176 between the hub 182 and a collar 188 mounted on the rod 176 at the end of the rod.

The rod 176 engages a roller on the free end of an arm 190. The arm 190 is rigidly secured on one end of a shaft 191 which is pivotally mounted in the spacer 174, and arm 192 is rigidly secured to the other end of shaft 191. The free end of arm 192 is connected to a link 194 by pin 196. The other end of link 194 is pivotally connected to an arm 198. The arm 198 is rigidly secured on shaft 90 which serves as a pivot for this arm.

The input shaft 14 (Figures 4 and 5) is adapted to be rotated by a motor 200 (Figure 1) through a pair of gears 202 and 204. The motor 200 may drive the gears 202 and 204 and the shaft 14 at a constant speed to represent variations in an independent quantity such as time. The output shaft 116 (Figures 4 and 5) carries a gear 206 in mesh with a bevel gear 208. The bevel gear 208 in turn drives a shaft 210 to obtain an indication on a suitable output indicator such as a counter 212. Other types of indicators such as a graph plotter may also be used.

The orifice 150 acts to produce a drop in pressure as fluid flows through the orifice. For example, when fluid flows through the pipe 152 in a direction indicated by an arrow 220 in Figure 1, the pressure of the fluid at the nozzle 154 is greater than the pressure of the fluid at the nozzle 156 because of the drop in pressure across the orifice 150. This difference in pressure causes the fluid to act on the bellows 178 with a greater force than the force which the fluid exerts on the bellows 180. Since the bellows 178 has a greater force exerted on it than the bellows 180, the bellows 178 becomes contracted. This causes the rod 176 to move to the left in Figure 1 against the action of the spring 186, which exerts a restoring force to position the rod in a neutral position.

When the rod 176 moves to the left, it carries the arm 190 with it. The arm 192 follows the movement of the arm 190 and produces a corresponding movement of the link 194. The movement of the link 194 is translated into a corresponding pivotal movement of the arm 198 on the shaft 90, and a corresponding rotary movement of the shaft. The shaft 90 in turn pivotably drives the arm 84, which is mounted on the shaft.

The arm 84 is driven in a clockwise direction (as seen in Figures 1, 2, 3 and 8) when the difference in pressure across the orifice 150 increases. This may be seen by an initial position of the arm 84 in a solid line in Figure 8, as contrasted by broken lines representing the position of the linkage for a relatively high drop in pressure across the orifice 150. As the arm 84 pivots, it drives the linkage 80 because of the coupling provided between the linkages by the spring 82 (Figures 2 and 3) and the ball 86. The linkage 80 in turn drives the plate 30, which is freely movable because of the action of the rollers 32 and 34.

The movement of the plate 30 is controlled by the linkages 54 and 64. For example, as the arm 84 and link 80 drive the plate 30 to the left in Figures 1, 2 and 3, the linkage 64 pivots in a counter-clockwise direction in these figures because of its fulcrum on the block 38. This may also be seen in Figure 8, where the plate 30 is represented by a single line for purposes of explanation. The counter-clockwise pivotable movement of the linkage 64 causes a portion of the plate 30 to move to the left and toward the block 38 in Figures 2 and 3.

At the same time that the linkage 64 is pivoting in a counterclockwise direction, the linkage 54 is pivoting in a clockwise direction. The linkage is pivoting in a clockwise direction because of the fulcrum provided by the leaf spring 62 and the ball 61 on the block 36. This causes a part of the plate 30 to move to the left in Figures 2 and 3 and towards the block 36. The pivotal movement of the linkage 54 in the clockwise direction corresponds to the pivotal movement of the linkage 64 in the counter-clockwise direction. These movements correspond since the effective pivotal lengths of the linkages 54 and 64 are substantially equal.

Since the linkage 54 pivots towards the block 36 and the linkage 64 pivots towards the block 38, their effective movement in this direction cancels at a position intermediate between the linkages. This position corresponds to the center of the balls 48 and 50. In this way, the balls 48 and 50 and the intermediate position of the plate move linearly to the left as the linkages 84 and 80 move the plate to the left. This movement is in a radial direction relative to the disc 20 since the balls 48 and 50 are directly to the left of the center of the disc.

As previously described, the motor 200 rotates the shaft 14 and the disc 20 at a substantially constant angular rate representing variations in an independent quantity such as time. Since the ball 48 contacts the disc 20, it follows the movements of the disc. Thus, as the disc 20 rotates, it drives the ball 48 at an angular rate proportionate to the rotation of the disc. The ball 48 also rotates at any instant at an angular rate dependent upon its instantaneous radial positioning on the disc. In this way, the rotation of the ball 48 represents the integral of the radial position of the ball on the disc 20 with respect to variations in the independent quantity such as time.

The ball 50 follows the movements of the ball 48 since it contacts the ball 48. The ball 50 in turn drives the disc 100 (Figures 4 and 5) through angular movements corresponding to the rotation of the ball. The disc 100 in turn drives the shaft 102 and the gear 112, which drives the gear 114 and the output shaft 116. The rotary movements of the output shaft 116 are recorded in an indicator such as the counter 212 (Figure 1), which counts the revolutions of the shaft. In this way, the indications on the counter represent the integral with respect to time of the square root in the drop of pressure.

Figures 8, 10, 11:
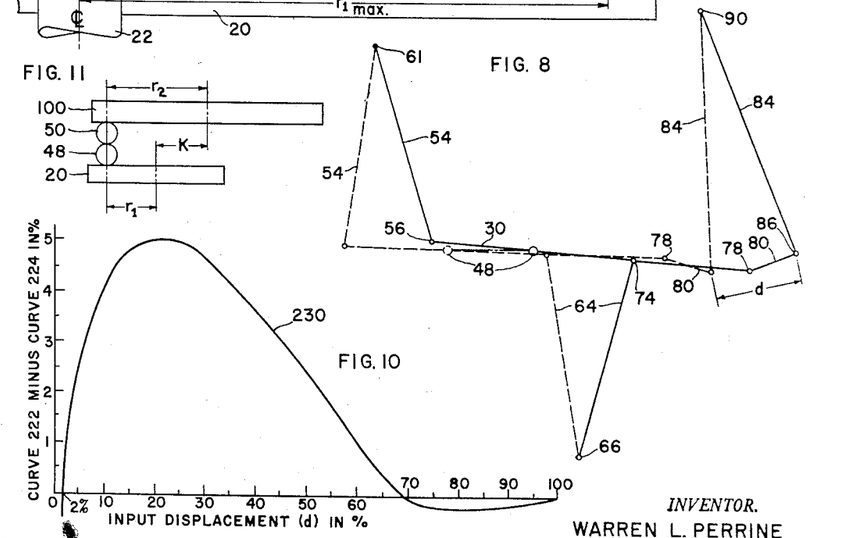
Figure 8 is a plan view schematically illustrating the operation of certain members shown in the previous figures, the members being shown in solid lines to represent one position and in broken lines to represent a second position.
Figure 10 illustrates a curve showing on an enlarged scale the difference between the two curves shown in Figure 9.
Figure 11 is a schematic elevational view of certain important members previously shown in elevation in Figure 4 and shows the relative distances between the radial centers of these members for purposes of subsequent discussion.

The operation of the above apparatus may be further seen from the schematic representation shown in Figure 11. As will be seen in Figure 11, the center of the disc 20 may be considered as being separated at any instant by a distance $r_1$ from the position at which the ball 48 contacts the disc. Similarly, the center of the disc 100 may be considered as being separated at any instant a distance $r_2$ from the position at which the ball 50 contacts the disc.

Since the angular movement of the disc 20 is transmitted through the balls 48 and 50 to the disc 100, the movement of a point on the disc 100 at any instant is equal to the movement of a point on the disc 20 at the same instant. For this reason, $$2\pi r_1 R_1 = 2\pi r_2 R_2 \qquad (1)$$

where
$R_1$ = the speed of rotation of the disc 20 at any instant; and
$R_2$ = the speed of rotation of the disc 100 at the same instant.

Solving Equation 1 for $R_2$, $$R_2 = \frac{2\pi r_1}{2\pi r_2} R_1 = \frac{r_1}{r_2} R_1 \qquad (2)$$

As will be seen from the schematic representation of Figure 11, the horizontal distance between the radial centers of the discs 20 and 100 is a constant distance which may be designated as K. It will be further seen that the horizontal distance $r_2$ may be designated as $$r_2 = r_1 + K \qquad (3)$$

Substituting Equation 3 in Equation 2, $$R_2 = \frac{r_1}{r_1 + K} R_1 \qquad (4)$$

Figure 9:
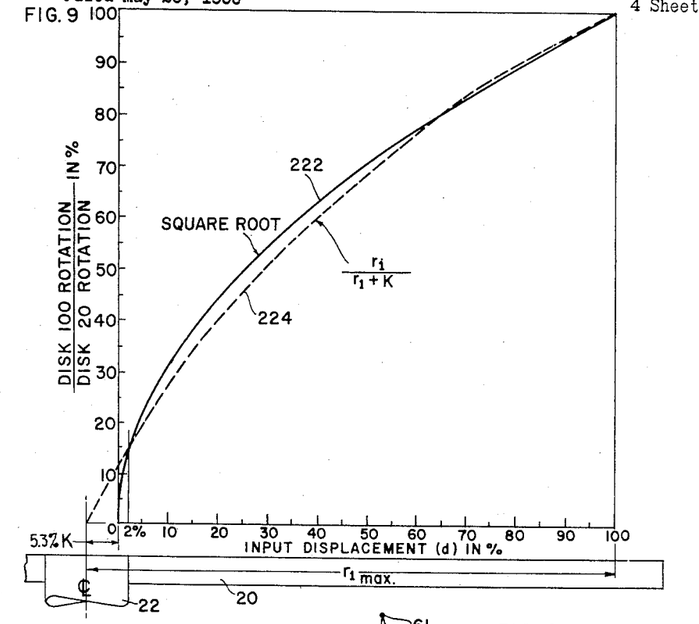
Figure 9 illustrates a pair of curves, one showing in a solid line the square root of a quantity and the other showing in broken lines a curve generated by certain components in the integrating apparatus to approach the square root value.

By choosing a particular value for K, the angular speed $R_2$ of the disc 100 may be made to approximate a square root function of the value of $r_1$. This optimum value for K has been found to be approximately 0.324 inch. By using such a value for K a curve indicated in broken lines at 224 in Figure 9 is seen to be generated. The horizontal distance from the axis of the curve represents the horizontal distance between the radial centers of the ball 48 and the disc 20. The maximum horizontal distance shown in Figure 9 represents a value of $r_1 = K$, where $r_1$ and K have been previously defined. The vertical distance from the axis of the curve represents the ratio $$\frac{r_1}{r_1 + K}$$

as expressed above in Equation 4.

As will be seen in Figure 9, the curve 224 approximates a curve 222 shown in solid lines and representing a true square root function. The horizontal distance from the axis represents the displacement of the rollers 48 and 50 radially from the center of the disc 20. The vertical distance represents the square root of the horizontal value in percent of full scale. As will be seen, the curves 222 and 224 intersect at a position approximately 2% of full scale along the horizontal axis. This represents the radius of the pin 22. From a practical standpoint, this can be considered as the zero position along the horizontal axis.

The maximum error between the two curves will be seen at any position to be less than 5%. This error is shown in magnified form for each position by a curve 230 in solid lines in Figure 10. Most of this error is compensated by members including the linkage 80 between the arm 84 and the plate 30, as will be described in detail subsequently. As will be seen in Figure 10, the zero position along the horizontal axis is shown as being approximately 2% of full scale, since from a practical standpoint this is the first position at which any output can be obtained. This results from the operation of the pin 22 in limiting any angular movement of the rollers 48 and 50.

The compensation provided by the linkage 80 may be seen from the following discussion. As will be seen in Figure 10, a steeply increasing amount of compensation is needed as the input to the shaft 90 and the linkage 84 initially increases from a low value. This is obtained by initially disposing the linkage 80 in a position indicated by a solid line in Figure 8. In this position, the linkage 80 has a component of movement towards the left in Figures 2, 3 and 8. This component of movement continues until the linkage 80 adopts a position substantially parallel to the front wall of the casing 10. Since the plate 30 follows the movement of the linkage 80 to the left, the plate receives a compensatory movement to correct for the error represented by the curve 230. This compensatory movement is in addition to that provided by the pivotal movement of the linkage 84. The compensatory movement of the plate 30 is on a cumulative basis until the linkage 80 becomes substantially parallel to the front wall of the casing 10. This corresponds to maximum value of the curve 232 in Figure 10.

As the arm 84 continues to pivot in a counterclockwise direction for increasing drops in fluid pressure, it pivots the linkage 80 in a clockwise direction. This causes the linkage 80 to pivot with a component towards the right in Figures 2 and 3 after it has reached a position substantially parallel to the front wall of the casing 10. The movement of the linkage 80 with a component to the right in Figures 2 and 3 causes the cumulative compensation provided by the linkage 80 to decrease. This is in accordance with the portion of the curve 230 decreasing from a maximum value to a value of "0."

It should be appreciated that the above discussion relating to the correction of the error shown in magnified form in Figure 11 is accomplished by other members in addition to the linkage 80. These members include the arm 84, the plate 30 and the linkages 54 and 64. As a result of the combined action of these various members, a maximum error of 0.1% or less is obtained for every value along the abscissa. For most values along the abscissa, the error is considerably less than 0.1%. Since the value being measured is generally fluctuating, the error will usually average out to a value considerably less than 0.1%.

The error is minimized in another way. The error is minimized by turning the bushing 88 in its socket in the cover 12. Since the bushing 88 is eccentric, the shaft 90 can be adjusted in position in the socket as the bushing 88 is turned. This in turn alters the initial positions of the linkage 80, the arm 84 and the plate 30. By this adjustment, the operating curves in Figures 9 and 10 can be adjusted relative to the desired curves to minimize the final error which is obtained. The initial positions of the linkages 84 and 80 and the plate 30 are adjusted to compensate for variations from the theoretically optimum dimensions of various components. Such variations result from tolerances which must be specified during production.

In order to prevent any rotation of the balls 48 and 50 for a substantially zero input to the linkages 84 and 80, a decoupling mechanism is included. This decoupling mechanism is included so that no output will be transmitted to the disc 100 when no input motion is imparted to the arm 84 and the linkage 80. The pin 22 provides such a decoupling action by remaining stationary while the disc 20 is rotating.

Because of its stationary disposition, the pin 22 prevents the ball 48 from rotating when the ball is contacting the pin. The ball cannot rotate even while the disc 20 is rotating as long as the ball contacts the pin 22. This prevents the motion of the disc from being transmitted through the balls 48 and 50 to the disc 100, the gears 112 and 114 and the output shaft 116. In this way, no output measurements are obtained until the measurements approach a value 240 in Figure 9. By decreasing the diameter of the pin 22, lower values of the input parameter such as the drop in pressure across an orifice might be measured. However, decreases in the diameter of the pin 22 tend to increase the possibility that the rollers 48 and 50 might rotate at zero flow. This rotation of the rollers 48 and 50 at zero flow may result from temperature effects on the sensing elements or a play in linkages.

The apparatus described above has several important advantages. It receives continuous indications of a parameter such as the drop in fluid pressure across an orifice. The apparatus then operates to convert these indications into a particular function such as the square root of the parameter. This conversion is obtained without requiring that the indications be amplified in any way before they are introduced to the apparatus.

The apparatus obtains the conversion by moving a plate in accordance with controls exerted on the plate by several linkages appropriately coupled to the plate. Additional linkages and an eccentric bushing are included for compensating for any errors that may be obtained so as to produce a close approximation to the function desired. After generating the particular function, the apparatus operates to obtain the integral of the function with respect to variations in an independent quantity such as time.

What is claimed is:

1. Apparatus for obtaining an integrand representing a particular function of an input quantity and for integrating the integrand with respect to variations in an independent quantity such as time, including, a first member angularly movable through distances representing variations in the independent quantity, a movable plate, means including a first linkage for pivoting one end of the plate in a first direction through a first angular distance dependent upon the value of the input quantity, means including a second linkage for pivoting the other end of the plate in an opposite direction through an angular distance corresponding to the first angular distance, a second member displaced by a particular distance from the first member and angularly movable in accordance with the movements of the first member, and means including at least a first ball disposed at an intermediate position along the plate and between the first and second linkages for receiving relative to the first and second members a linear positioning dependent upon the angular movements of the plate and for receiving an angular movement dependent upon its linear positioning and the angular movement of the first member and for imparting to the second member angular movements representing the integral of the integrand and the independent quantity.

2. Apparatus as set forth in claim 1 including a pin extending through the first member in stationary relationship to the first member to limit the angular movement of the ball and the second member for linear displacements of the ball less than a particular value.

3. Apparatus as set forth in claim 1 in which the ball is housed within a sleeve made from a resilient material such as nylon.

4. Apparatus as set forth in claim 1 in which the pair of balls are disposed within a resilient sleeve made from a resilient material.

5. Apparatus for obtaining an integrand representing a particular function of an input quantity and for integrating the integrand with respect to variations in an independent quantity such as time, including, a disc rotatable to represent variations in the independent quantity, a plate movable along the disc, means including a first linkage pivotable at one end in accordance with the value of the input quantity and coupled to the plate at the other end for producing a corresponding movement of the plate, means including a pair of linkages for producing pivotal movements of the plate in opposite angular directions at a pair of spaced positions to compensate at an intermediate position for movements of the plate in a first direction and to produce a resultant movement of the plate at the intermediate position in only a second direction radial to the disc, means including a pair of balls disposed between the disc and the plate at the intermediate position for receiving an angular movement in accordance with the radial position of the balls along the disc and with the angular movement of the disc, and an output shaft rotatable in accordance with the angular movement of the balls.

6. Apparatus as set forth in claim 5 including a stationary pin extending through the first disc at the center of the disc for limiting the rotation of the ball until there is a radial movement of the center of the ball from the center of the pin through a distance greater than the radius of the pin.

7. Apparatus for obtaining an integrand representing a particular function of an input quantity and for integrating the integrand with respect to variations in an independent quantity such as time, including, a movable plate, first and second linkages pivotable in opposite directions at spaced positions for imparting a rocking motion to the plate and for imparting a linear motion at an intermediate position between the linkages, means including a third linkage pivotable through an angle representing the input quantity to impart to the plate a motion controlled by the first and second linkages, a first disc rotatable in accordance with variations in the value of the independent quantity, a second disc rotatable dependent upon said first disc, and means including a pair of balls coupled between the discs and movable with the plate at the intermediate position for rotating in accordance with the rotation of the disc and the linear positioning of the plate at the intermediate position.

8. Apparatus for obtaining an integrand representing a particular function of an input quantity and for integrating the integrand with respect to variations in an independent quantity such as time, including, a casing, a first linkage pivotably attached to the casing at one end, a second linkage pivotably attached to the casing at an opposite end relative to the attachment of the first linkage and at a position spaced from the first linkage, a plate pivotable by the first and second linkages to receive a linear movement at an intermediate position between the first and second linkages, means including a third linkage for providing a movement of the plate in accordance with the variations in the value of the input quantity and in accordance with the controls exerted by the first and second linkages, a disc rotatable in accordance with variations in the value of the independent quantity, means including a pair of balls movable by the plate for receiving a rotary motion in accordance with the rotary motion of the disc and the disposition of the plate at the intermediate position, and means including an output shaft for receiving a rotary motion in accordance with the rotary motion imparted to the balls.

9. Apparatus for obtaining an integrand representing a particular function of an input quantity and for integrating the integrand with respect to variations in an independent quantity such as time, including, a plate, means including a first linkage pivotable in accordance with variations in the value of the input quantity for imparting a motion to the plate, means including second and third linkages separated from each other to control the movement of the plate in a rocking pattern and to impart a linear movement to the plate at an intermediate position between the second and third linkages, a first disc rotatable in accordance with variations in the value of the independent quantity, means including an output shaft carrying a rotatable second disc and balls coupled to the discs and the plate for receiving an angular movement in accordance with the disposition of the plate at the intermediate position, and in accordance with the rotation of the disc, and means coupled to the plate and the first linkage for providing a correction in the linear movement of the plate at the intermediate position to obtain a movement representing the particular function of the input quantity.

10. Apparatus for obtaining an integrand representing a particular function of an input quantity and for integrating the integrand with respect to variations in an independent quantity such as time, including, a plate, means including a first shaft and a first linkage for providing a controlled movement of the plate in accordance with variations in the value of the input quantity, means including second and third linkages for imparting a rocking motion to the plate in accordance with the movement imparted to the plate by the first means and for imparting a linear movement of the plate at a position intermediate of the linkages, means including a fourth linkage coupled to the first linkage and the plate for imparting a corrective movement to the plate in accordance with the pivotal disposition of the fourth linkage, a first disc rotatable in accordance with variations in the value of the independent quantity, a second disc rotatable dependent upon said first disc and means including a pair of balls disposed between the disc and the plate for receiving an angular motion in accordance with the rotation of the disc and the linear movement of the plate at the intermediate position.

11. Apparatus for obtaining an integrand representing a particular function of an input quantity and for integrating the integrand with respect to variations in an independent quantity such as time, including, a first disc rotatable through angular distances representing the independent quantity, a second disc rotatable dependent upon said first disc, an input shaft for receiving a pivotal movement representing the input quantity, a plate, means including a first linkage pivotable with the input shaft for producing a movement of the plate, means including second and third linkages for providing pivotal movements of the plate in opposite directions in accordance with the pivotal movements of the first linkage to produce at an intermediate position between the second and third linkages a radial movement relative to the discs, means including a fourth linkage for providing a corrective factor to the movement imparted by the first linkage to the plate in accordance with the pivotal disposition of the fourth linkage, and means including a pair of balls disposed between the discs and radially movable with the plate for receiving an angular movement dependent upon the rotation of the disc and the radial disposition of the balls.

12. Apparatus for obtaining an integrand representing a particular function of an input quantity and for integrating the integrand with respect to variations in an independent quantity such as time, including, an input shaft for receiving a pivotal movement in accordance with variations in the value of the input quantity, a first disc rotatable in accordance with variations in the value of the independent quantity, a plate, means including a plurality of linkages for producing a movement of the plate in accordance with the pivotal movement of the input shaft and for producing a radial movement of the plate relative to the first disc at a particular position, means including a second disc for receiving an angular movement in accordance with the movement of the first disc and the radial disposition of the plate to represent the integral of the integrand and the independent quantity, means carried by said plate for translating motion from said first disc to said second disc and means including an eccentric bushing disposed on the shaft for adjusting the linkage positions relative to the plate to minimize errors between the second disc and the representation of the integral of the particular function.

13. Apparatus for obtaining an integrand representing a particular function of an input quantity and for integrating the integrand with respect to variations in an independent quantity such as time, including, an input shaft for receiving a pivotal movement representing the input quantity, a first disc rotatable to represent variations in the independent quantity, a second disc rotatable dependent upon said first disc, a plate, means including at least one linkage disposed between the input shaft and the plate for translating pivotal movements of the input shaft into movements of the plate, means including a pair of linkages coupled to the plate at spaced positions for producing a radial movement of the plate relative to the disc at an intermediate position between the linkages, means including at least one ball coupled to the plate and the discs at the intermediate position for receiving an angular movement related to the radial movement of the plate and the angular movement of the first disc, said second disc being disposed in a particular relationship to the first disc and the ball for receiving from the ball a movement representing the integral of the integrand and the independent quantity, and an eccentric bushing for adjusting the initial position of the input shaft to minimize any errors in the movement of the second disc in representation of the integral.

14. Apparatus for obtaining an integrand representing a particular function of an input quantity and for integrating the integrand with respect to variations in an independent quantity such as time, including, a casing, a first linkage pivotably attached to the casing at one end, a second linkage pivotably attached to the casing at an opposite end relative to the attachment of the first linkage and at a position spaced from the first linkage, a plate pivotable by the first and second linkages to receive a linear movement at an intermediate position between the first and second linkages, an input shaft rotatable in accordance with variations in the value of the input quantity, means including a third linkage for providing a movement of the plate in accordance with the rotary movement of the input shaft and with the controls exerted by the first and second linkages, means including a fourth linkage disposed between the third linkage and the plate for providing a compensatory movement of the plate to correct for errors in the movement of the plate provided by the third linkage, an eccentric bushing for providing an adjustable positioning of the input shaft to minimize errors in the movement of the plate, a disc rotatable in accordance with variations in the value of the independent quantity, output means rotatable dependent upon said disc, and means including a pair of balls disposed between the disc and the output means and carried by the plate for receiving a rotary motion in accordance with the rotary motion of the disc and the disposition of the plate at the intermediate position.

15. Apparatus as set forth in claim 14, including a stationary pin extending through said disc at the center thereof for stopping the rotation of said balls until the centers of said balls are moved radially from the center of said pin through a distance greater than the radius of said pin.

16. Apparatus as set forth in claim 14 in which the pair of balls is housed within a sleeve made from a resilient material such as nylon.

17. Apparatus as set forth in claim 14, in which the pair of balls is housed within a sleeve made from a resilient material.

18. Apparatus for obtaining an integrand representing a particular function of an input quantity and for integrating the integrand with respect to variations in an independent quantity such as time, including, an input shaft for receiving a pivotal movement in accordance with the value of the input quantity, a first disc rotatable to represent variations in the independent quantity, a plate, means including a plurality of linkages for converting the pivotal movement of the input shaft into a radial movement of the plate relative to the disc at a particular position, means including at least one ball coupled to the disc and the plate and movable with the plate along the radial path for producing an angular rotation related to the movements of the disc and the radial position of the balls on the disc, a second disc disposed in driven relationship to the balls to receive from the balls a movement representing the integral of the integrand with respect to the variations in the independent quantity, and a stationary pin extending through the first disc at the center of the disc for limiting the rotation of the ball until a radial movement of the ball from the center of the second disc through a distance greater than the radius of the pin.

19. Apparatus for obtaining an integrand representing a particular function of an input quantity and for integrating the integrand with respect to variations in an independent quantity including an input shaft for receiving a pivotal movement in accordance with the value of an input quantity, a first disc rotatable to represent variations in the independent quantity, a second disc rotatable dependent on the first disc, a plate interposed between said discs, means for converting the pivotal movement of said input shaft into movement of said plate relative to said discs at a particular position, and balls carried by said plate and coupled to said discs for moving the second disc in a movement representing the integral of the integrand with respect to the variations in the independent quantity, the movement of said balls carried by said plate being in a plane coincident with the axis of said discs and outside the plane between said axis.

20. Apparatus for obtaining an integrand representing a particular function of an input quantity and for integrating the integrand with respect to variations in an independent quantity such as time, including, an input shaft for receiving a pivotal movement in accordance with the value of the input quantity, a first disc rotatable to represent variations in the independent quantity, a second disc rotatable dependent upon the first disc, a plate, means including a plurality of linkages for converting the pivotal movement of the input shaft into a radial movement of the plate relative to the discs at a particular position, means including at least one ball coupled to the discs and the plate and movable with the plate along the radial path for producing an angular rotation related to the movements of the first disc and the radial position of the balls on the first disc, said second disc disposed in driven relationship to the balls to receive from the balls a movement representing the integral of the integrand with respect to the variations in the independent quantity, and a stationary pin extending through the first disc at the center thereof for stopping the rotation of said ball until the center of said ball is moved radially from the center of said pin through a distance greater than the radius of said pin.

21. Apparatus for obtaining an integrand representing a particular function of an input quantity and for integrating the integrand with respect to variations in an independent quantity, such as time, including, a disc rotatable to represent variations in the independent quantity, a plate movable along the disc, means including a first linkage pivotable at one end in accordance with the value of the input quantity and coupled to the plate at the other end for producing a corresponding movement of the plate, means including a pair of linkages for producing pivotal movements of the plate in opposite angular directions at a pair of spaced positions to compensate at an intermediate position for movements of the plate in a first direction and to produce a resultant movement of the plate at the intermediate position in only a second direction radial to the disc, means including a pair of balls disposed between the disc and the plate at the intermediate position for receiving an angular movement in accordance with the radial position of the balls along the disc and with the angular movement of the disc, an output shaft rotatable in accordance with the angular movement of the balls, and a second disc having a plurality of balls disposed about its outer periphery, said second disc and balls supporting the first mentioned disc about its outer periphery on the side opposite said plate, whereby tilting movement of the first disc about its axis is prevented.

22. Apparatus for obtaining an integrand representing a particular function of an input quantity and for integrating the integrand with respect to variations in an independent quantity, such as time, including, a casing, a first linkage pivotably attached to the casing at one end, a second linkage pivotably attached to the casing at an opposite end relative to the attachment of the first linkage and at a position spaced from the first linkage, a plate pivotable by the first and second linkages to receive a linear movement at an intermediate position between the first and second linkages, an input shaft rotatable in accordance with variations in the value of the input quantity, means including a third linkage for providing a movement of the plate in accordance with the rotary movement of the input shaft and with the controls exerted by the first and second linkages, means including a fourth linkage disposed between the third linkage and the plate for providing a compensatory movement of the plate to correct for errors in the movement of the plate provided by the third linkage, an eccentric bushing for providing an adjustable positioning of the input shaft to minimize errors in the movement of the plate, a disc rotatable in accordance with variations in the value of the independent quantity, output means rotatable dependent upon said disc, means including a pair of balls disposed between the disc and the output means and carried by the plate for receiving a rotary motion in accordance with the rotary motion of the disc and the disposition of the plate at the intermediate position, and a second disc having a plurality of balls disposed about its outer periphery, said second disc and balls supporting the first mentioned disc about its outer periphery on the side opposite said plate whereby tilting movement of the first disc about its axis is prevented.

23. Apparatus for obtaining an integrand representing a particular function of an input quantity and for integrating the integrand with respect to variations in an independent quantity such as time, including, a movable plate, first and second linkages pivotable in opposite directions at spaced positions for imparting a rocking motion to the plate and for imparting a linear motion at an intermediate position between the linkages, means including a third linkage pivotable through an angle representing the input quantity to impart to the plate a motion controlled by the first and second linkages, a first disc rotatable in accordance with variations in the value of the independent quantity, a second disc rotatable dependent upon said first disc, means including a pair of balls coupled between the discs and movable with the plate at the intermediate position for rotating in accordance with the rotation of said first disc and the linear positioning of the plate at the intermediate position, a third disc having a plurality of balls disposed about its outer periphery, said third disc and balls supporting the first mentioned disc about its outer periphery on the side opposite said plate, whereby tilting movement of the first disc about its axis is prevented, and a fourth disc having a plurality of balls disposed about its outer periphery, said fourth disc and balls supporting the second mentioned disc about its outer periphery on the side opposite said plate, whereby tilting movement of the second disc about its axis is prevented.

24. Apparatus for obtaining an integrand representing a particular function of an input quantity and for integrating the integrand with respect to variations in an independent quantity such as time, including, a casing, a first linkage pivotably attached to the casing at one end, a second linkage pivotably attached to the casing at an opposite end relative to the attachment of the first linkage and at a position spaced from the first linkage, a plate pivotable by the first and second linkages to receive a linear movement at an intermediate position between the first and second linkages, an input shaft rotatable in accordance with variations in the value of the input quantity, means including a third linkage for providing a movement of the plate in accordance with the rotary movement of the input shaft and with the controls exerted by the first and second linkages, means including a fourth linkage disposed between the third linkage and the plate for providing a compensatory movement of the plate to correct for errors in the movement of the plate provided by the third linkage, an eccentric bushing for providing an adjustable positioning of the input shaft to minimize errors in the movement of the plate, a disc rotatable in accordance with variations in the value of the independent quantity, output means rotatable dependent upon said disc, means including a pair of balls disposed between the disc and the output means and carried by the plate for receiving a rotary motion in accordance with the rotary motion of the disc and the disposition of the plate at the intermediate position, a second disc having a plurality of balls disposed about its outer periphery, said second disc and balls supporting the first mentioned disc about its outer periphery on the side opposite said plate, whereby tilting movement of the first disc about its axis is prevented, and a third disc having a plurality of balls disposed about its outer periphery, said third disc and balls supporting the output means about its outer periphery on the side opposite said plate, whereby tilting movement of the second disc about its axis is prevented.

25. Apparatus for obtaining an integrand representing a particular function of an input quantity and for integrating the integrand with respect to variations in an independent quantity such as time, including, a movable plate, first and second linkages pivotable in opposite directions at spaced positions for imparting a rocking motion to the plate and for imparting a linear motion at an intermediate position between the linkages, means including a third linkage pivotable through an angle representing the input quantity to impart to the plate a motion controlled by the first and second linkages, a first disc rotatable in accordance with variations in the value of the independent quantity, a second disc rotatable dependent upon said first disc, means including a pair of balls coupled between the discs and movable with the plate at the intermediate position for rotating in accordance with the rotation of said first disc and the linear positioning of the plate at the intermediate position, a third disc having a plurality of balls disposed about its outer periphery, said third disc and balls supporting the first mentioned disc about its outer periphery on the side opposite said plate, whereby tilting movement of the first disc about its axis is prevented, a fourth disc having a plurality of balls disposed about its outer periphery, said fourth disc and balls supporting the second mentioned disc about its outer periphery on the side opposite said plate, whereby tilting movement of the second disc about its axis is prevented, a second plate mounted at one end on a support, said second plate being disposed and in contact with the last mentioned plurality of balls on the side opposite from said second disc and resilient means attached to said second plate urging said plate against said last mentioned plurality of balls.

26. Apparatus for obtaining an integrand representing a particular function of an input quantity and for integrating the integrand with respect to variations in an independent quantity such as time, including, a casing, a first linkage pivotably attached to the casing at one end, a second linkage pivotably attached to the casing at an opposite end relative to the attachment of the first linkage and at a position spaced from the first linkage, a plate pivotable by the first and second linkages to receive a linear movement at an intermediate position between the first and second linkages, an input shaft rotatable in accordance with variations in the value of the input quantity, means including a third linkage for providing a movement of the plate in accordance with the rotary movement of the input shaft and with the controls exerted by the first and second linkages, means including a fourth linkage disposed between the third linkage and the plate for providing a compensatory movement of the plate to correct for errors in the movement of the plate provided by the third linkage, an eccentric bushing for providing an adjustable positioning of the input shaft to minimize errors in the movement of the plate, a disc rotatable in accordance with variations in the value of the independent quantity, output means rotatable dependent upon said disc, means including a pair of balls disposed between the disc and the output means and carried by the plate for receiving a rotary motion in accordance with the rotary motion of the disc and the disposition of the plate at the intermediate position, a second disc having a plurality of balls disposed about its outer periphery, said second disc and balls supporting the first mentioned disc about its outer periphery on the side opposite said plate, whereby tilting movement of the first disc about its axis is prevented, a third disc having a plurality of balls disposed about its outer periphery, said third disc and balls supporting the output means about its outer periphery on the side opposite said plate, whereby tilting movement of the output means about its axis is prevented, a second plate mounted at one end on a support, said second plate being disposed and in contact with the last mentioned plurality of balls on the side opposite from said output means, and resilient means attached to said second plate urging said plate against said last mentioned plurality of balls.

References Cited in the file of this patent

UNITED STATES PATENTS

| | | |
|---|---|---|
| 2,377,898 | Myers | June 12, 1945 |
| 2,481,039 | Ross | Sept. 6, 1949 |
| 2,505,521 | Boyajian | Apr. 25, 1950 |
| 2,666,992 | Cloud | Jan. 26, 1954 |

FOREIGN PATENTS

| | | |
|---|---|---|
| 386,771 | Germany | Dec. 15, 1923 |

OTHER REFERENCES

"Computing Mechanisms and Linkages" (Svoboda), published by McGraw-Hill (New York), 1948, page 36 relied on.